United States Patent
Potter et al.

(10) Patent No.: US 6,315,967 B1
(45) Date of Patent: Nov. 13, 2001

(54) CRYSTALLIZING PROCESS

(75) Inventors: Terry C. Potter, Lambertville, MI (US); Peter J. Hatas, Sylvania; Liguo Zhao, Toledo, both of OH (US); Timothy J. Boyd, Ypsilanti; Brian C. McPike, Ann Arbor, both of MI (US)

(73) Assignee: Schmalbach-Lubeca AG, Ratingen (DE)

( * ) Notice: Subject to any disclaimer, the term of this patent is extended or adjusted under 35 U.S.C. 154(b) by 0 days.

(21) Appl. No.: 09/615,308

(22) Filed: Jul. 13, 2000

Related U.S. Application Data

(63) Continuation-in-part of application No. 09/349,047, filed on Jul. 7, 1999, now Pat. No. 6,139,812.

(51) Int. Cl.$^7$ ........................................................ B01D 9/00
(52) U.S. Cl. ........................ 422/245.1; 422/250; 422/251
(58) Field of Search ................................ 422/245.1, 250, 422/251

(56) References Cited

U.S. PATENT DOCUMENTS

| | | |
|---|---|---|
| 4,297,306 | 10/1981 | Yoshino et al. . |
| 4,375,442 | 3/1983 | Ota et al. . |
| 4,379,099 | 4/1983 | Ota et al. . |
| 4,386,046 | 5/1983 | Yoshino et al. . |
| 4,388,356 | 6/1983 | Hrivnak et al. . |
| 4,412,966 | 11/1983 | Yoshino et al. . |
| 4,476,084 | 10/1984 | Takada et al. . |
| 4,572,811 | 2/1986 | Ota et al. . |
| 4,587,075 | 5/1986 | Butcher et al. . |
| 4,589,599 | 5/1986 | Hayashi et al. . |
| 4,590,021 | 5/1986 | Ota et al. . |
| 4,591,060 | 5/1986 | Tsukada et al. . |
| 4,991,728 | 2/1991 | Hayashi et al. . |
| 5,261,545 | 11/1993 | Ota et al. . |
| 5,308,233 | 5/1994 | Denis et al. . |
| 5,540,879 | 7/1996 | Orimoto et al. . |
| 5,576,084 | 11/1996 | Takada et al. . |
| 5,645,789 | 7/1997 | Rocher, Jr. . |
| 5,650,114 | 7/1997 | Ward et al. . |
| 5,665,297 | 9/1997 | Ward et al. . |

FOREIGN PATENT DOCUMENTS

| | | |
|---|---|---|
| 1182963 | 2/1985 | (CA) . |
| 299 08 980 | 9/1999 | (DE) . |
| 0 066 983 | 12/1982 | (EP) . |
| 0 109 464 | 5/1984 | (EP) . |
| 0202973 | 11/1986 | (EP) . |
| 2 074 932 | 11/1981 | (GB) . |
| WO99/22928 | 5/1999 | (WO) . |

*Primary Examiner*—Felisa Hiteshew
(74) *Attorney, Agent, or Firm*—Emch, Schaffer, Schaub & Porcello Co., L.P.A.

(57) ABSTRACT

A process for crystallizing a thermoplastic preform or container which utilizes a preheated plug to provide the sole upright support for a workpiece in the crystallizing process. The preheated plug aids in the crystallization process by applying heat to the interior surface of the finish area while heat is also applied to the exterior surface of the finish area to crystallize the finish area. The thermoplastic preform or container is then cooled and removed from the plug.

9 Claims, 11 Drawing Sheets

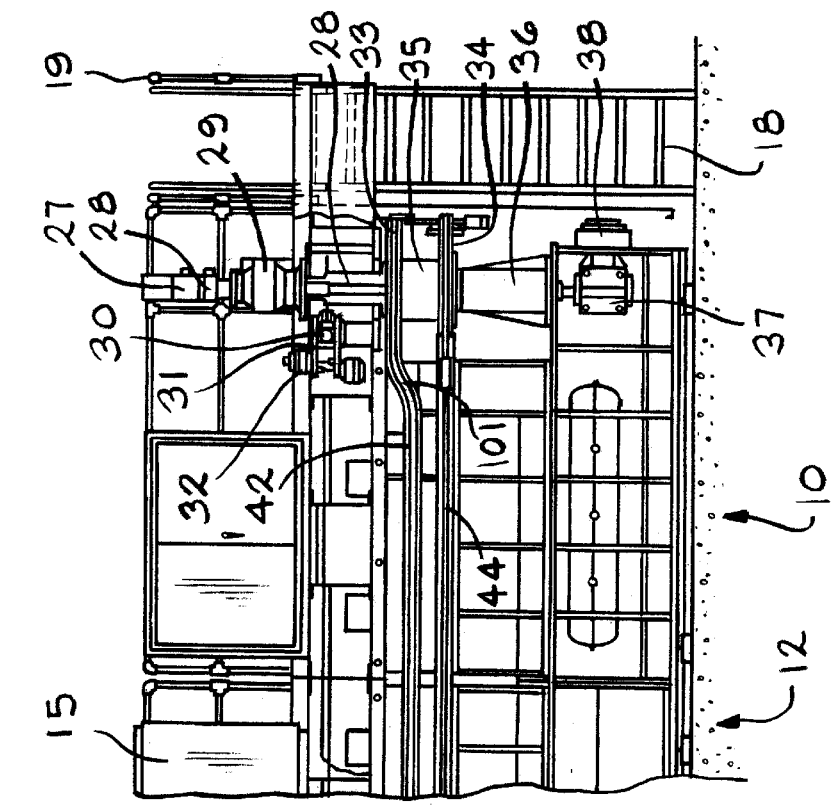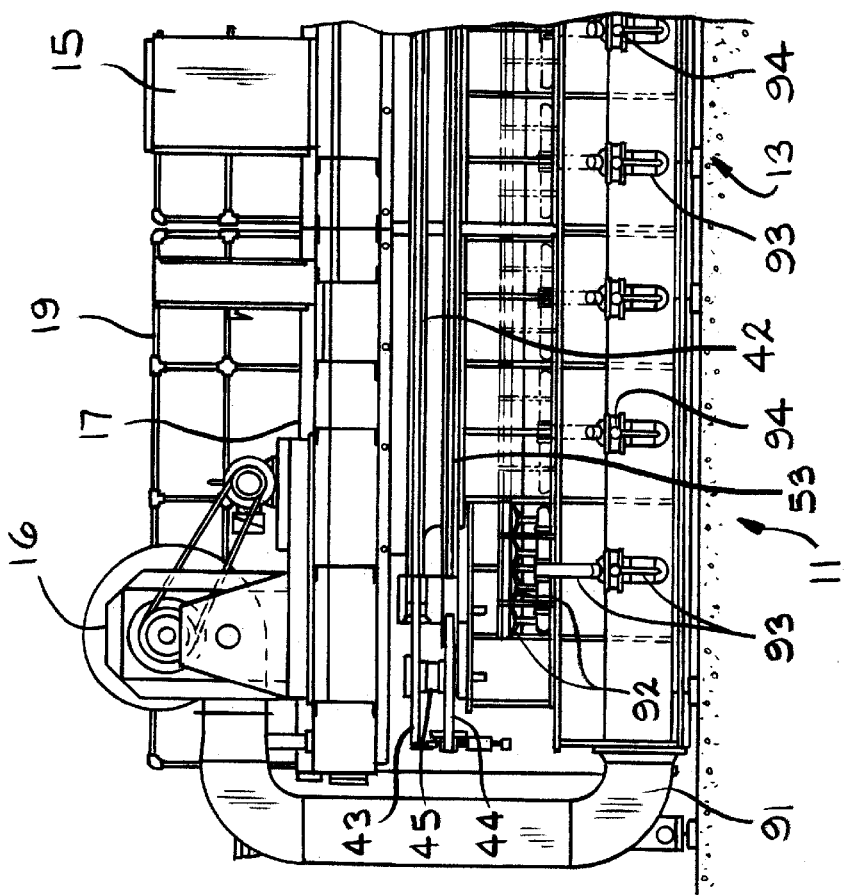
FIG. 1

CRYSTALLIZING PROCESS

RELATED APPLICATION

This application is a continuation in part of Ser. No. 09/349,047 filed on Jul. 7, 1999 now U.S. Pat. No. 6,139,812, the subject matter of which is expressly incorporated herein by reference.

TECHNICAL FIELD

This invention relates to a process for use in strengthening the finish area of a hollow blow molded container manufactured from a thermoplastic, such as a thermoplastic polyester or a biaxially oriented polyethylene terephthalate resin. The process described herein can readily be practiced by the apparatus disclosed and claimed in co-pending application Ser. No. 09/349,047, filed on Jul. 7, 1999.

BACKGROUND ART

A hollow blow molded thermoplastic, such as a thermoplastic polyester or a biaxially oriented polyethylene terephthalate resin, "PET", container, commonly used to contain food or beverage, has excellent physical properties, durability, and a wide range of applications. However, when used in hot-fill applications, certain portions of the container which are not subjected to the biaxial orientation during the blow molding process, such as the neck area, seal edge or thread, commonly referred to as the finish area, are found to soften and deform in an undesirable manner because the temperature of the food or beverage fill is often above the glass transition temperature of the plastic. Many methodologies and processes have been tried in attempt to strengthen the finish area of such containers by enhancing the density of the resin and opacifying and whitening the finish area through crystallization of the thermoplastic resin by heat treating the finish area.

Strengthening the finish area of a thermoplastic container greatly increases the thermal stability of the finish area, improves the mechanical rigidity and increases impact resistance, wear resistance, and external pressure resistance of the container. However, a common side effect of such a thermal treatment of the finish area of the container is an undesirable deformation of the finish area, thus leading to problems with capping and sealing the container.

When crystallizing the finish area it is desirable to maintain the dimensional quality of the finish area while optimizing the crystallization rate. Such dimensional stability and the crystallization rate are each dependent upon numerous variables such as the diameter of the finish area, the material used and the energy applied to the finish area. It has also been found that a common negative effect of crystallization is the distortion of the finish area into wavy segments due to a lack of support within the finish area as the material softens during crystallization.

U.S. Pat. No. 4,476,084 provides a solution to the problem of deformation during heat treating by placing a cold die pin or plug into the bore of the finish prior to heating. The cold die pin assists in maintaining the proper size and shape of the finish area during the crystallization process. Others have found similar solutions. See, for example, U.S. Pat. Nos. 4,388,356, 4,379,099, 4,572,811, 4,590,021 and 5,261,545. The use of such cold plugs and dies however have led to problems when speed of manufacture is a priority. Inefficient heating, failure to properly position the plug and deformation of the thermoplastic container due to the weight of the plug have commonly been experienced, thereby leading to a further search for a fast, efficient way of crystallizing and maintaining the dimensional stability of the neck area of the thermoplastic container.

Thus, crystallizing processes balance two distinct criteria: the crystallization rate and the quality of the finish area. The use of a cold die plug to improve the quality of the finish area negatively affects the crystallization rate and if the plug is not used, thus improving the crystallization rate, the finish quality is negatively affected.

BRIEF DESCRIPTION OF THE INVENTION

The crystallizing process of this invention improves upon the efforts of the prior art in many ways. The process makes use of a preheated plug which is inserted into the mouth or neck finish area of a thermoplastic preform or container, commonly known as a workpiece. While the workpiece is described herein as being a thermoplastic, it is preferable that it be a thermoplastic polyester, and even more preferable that it be polyethylene terephthalate (PET). For the purposes of this description, references will be made to PET workpieces. However, this description is not intended to be limiting on the invention described herein.

The workpiece is carried solely in an upright position by the preheated plug through the crystallizing process. The preheated plug assures even and efficient heating when crystallizing the finish area of the workpiece and constrains the shape of the finish area to a predetermined size and shape during the crystallizing process.

For the purposes of the following description of the preferred embodiment of the process, reference will be had to the following drawings and the crystallizing machine disclosed therein which practices the inventive process. However, the description of the apparatus is not intended to be limiting upon the scope of the process claims which follow.

BRIEF DESCRIPTION OF THE DRAWINGS

FIG. 1 is a right side elevation view with cutaway of a machine with access doors removed which can be operated in accordance with the process of the present invention.

DETAILED DESCRIPTION OF THE PREFERRED EMBODIMENT

The process of this invention provides a preheated plug member which is inserted into the finish area of a perform or bottle. The plug is preheated to a temperature within the range of 175° F. to 350° F., preferably around 250° F., which is determined to initiate crystallization of the finish area from the interior surface of the finish area. The plug also serves to provide the sole support for the workpiece and transport the workpiece in an upright position through the finish area crystallization process. The use of a preheated plug provides a quality crystallized finish area that is dimensionally stable at an improved crystallization rate, thereby providing a dramatic improvement over the current known crystallization processes.

Referring now to FIGS. 1–4, the process of this invention is practiced by a machine which, as described herein, is shown to have four modular sections. The number of modular sections can be varied as desired by increasing the number of processing sections in order to meet design demands for workpiece size, material and speed of operation. The description of the machine is not intended to be limiting upon the scope of the inventive process claimed herein. It is envisioned that the process claimed could be practiced by machines of differing design.

Figure 2:
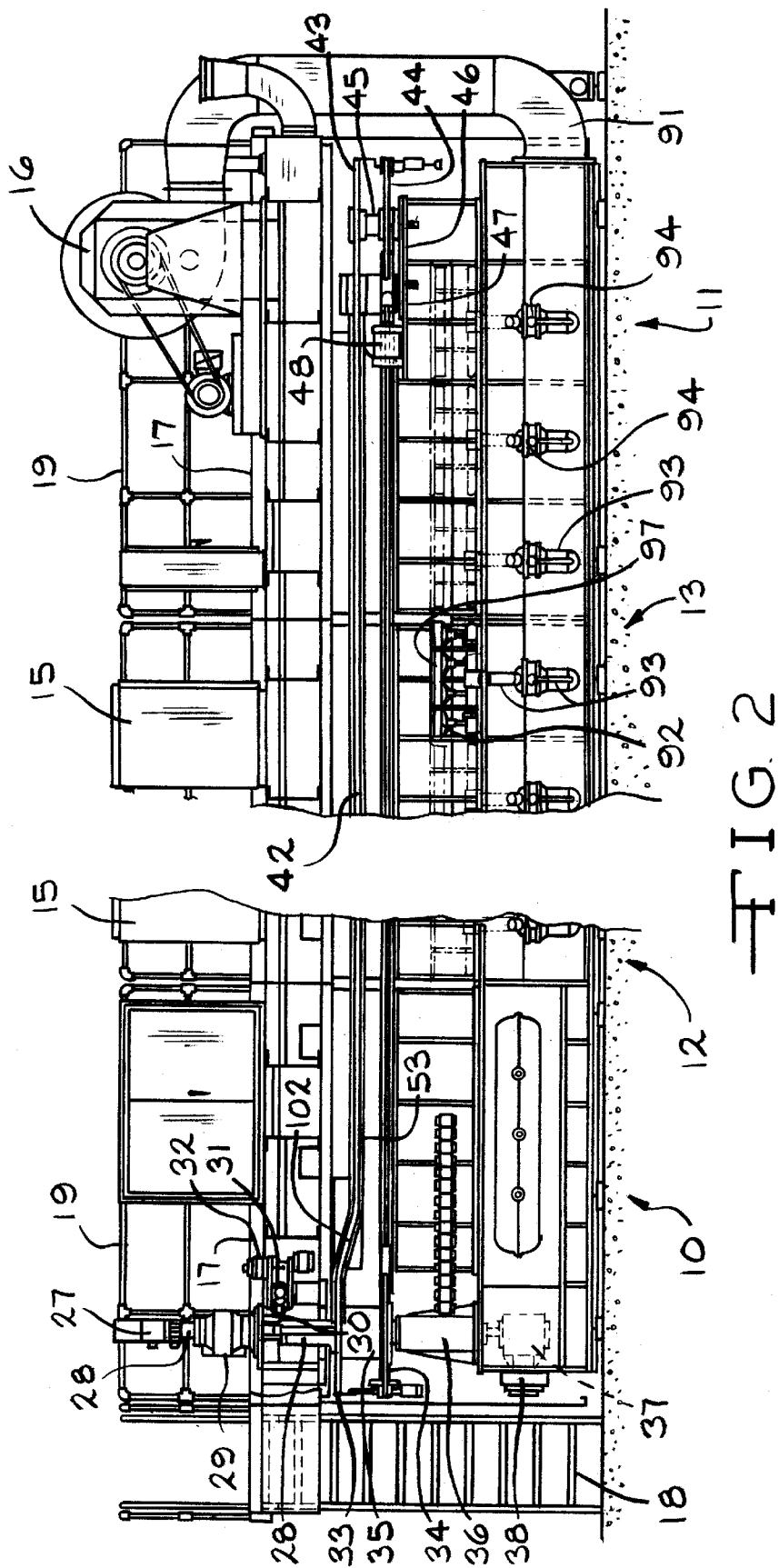
FIG. 2 is a left side elevation view with cutaway of the machine of FIG. 1 with access doors removed.
Figure 3:
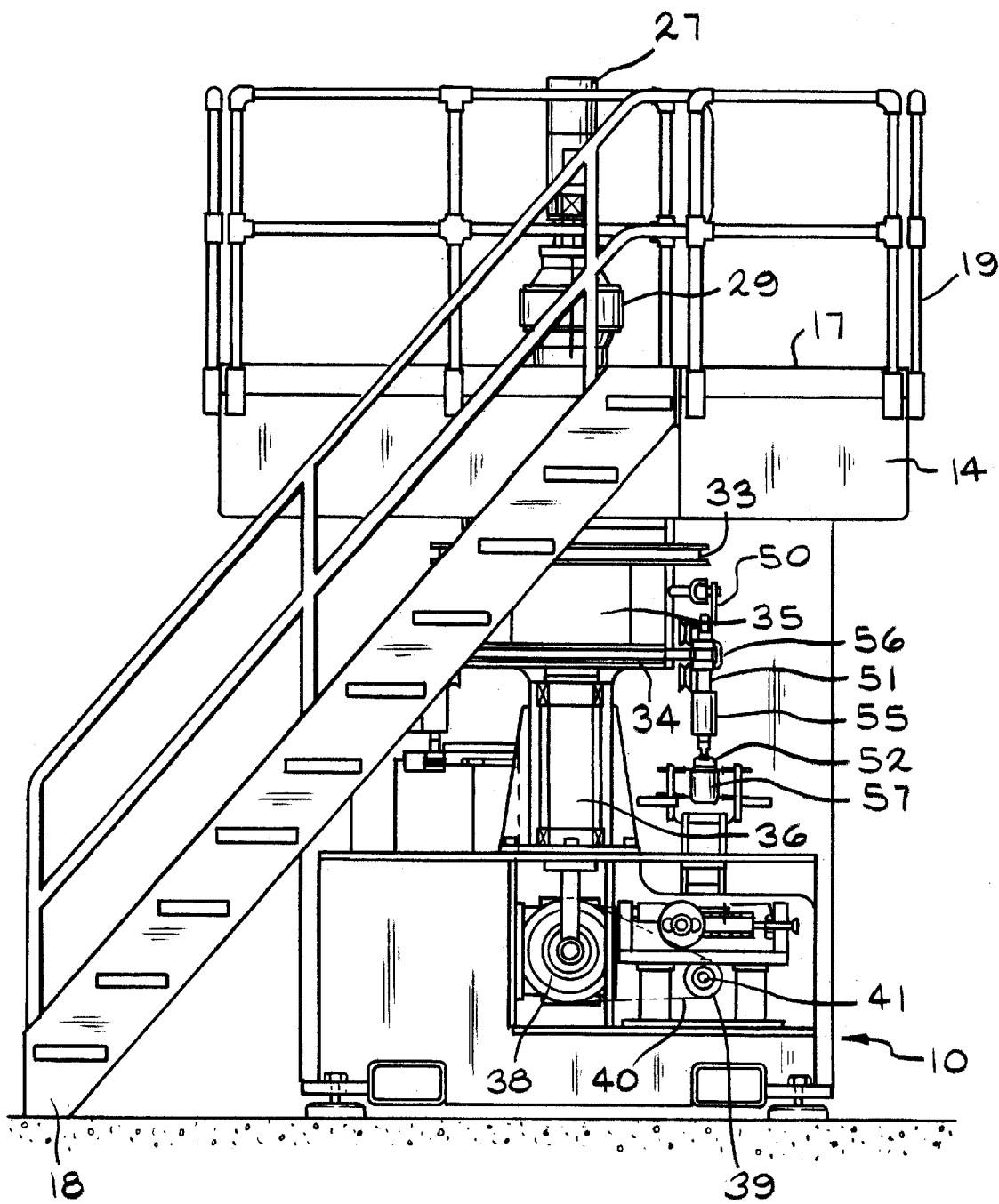
FIG. 3 is a front elevation view of the machine of FIG. 1.
Figure 5:
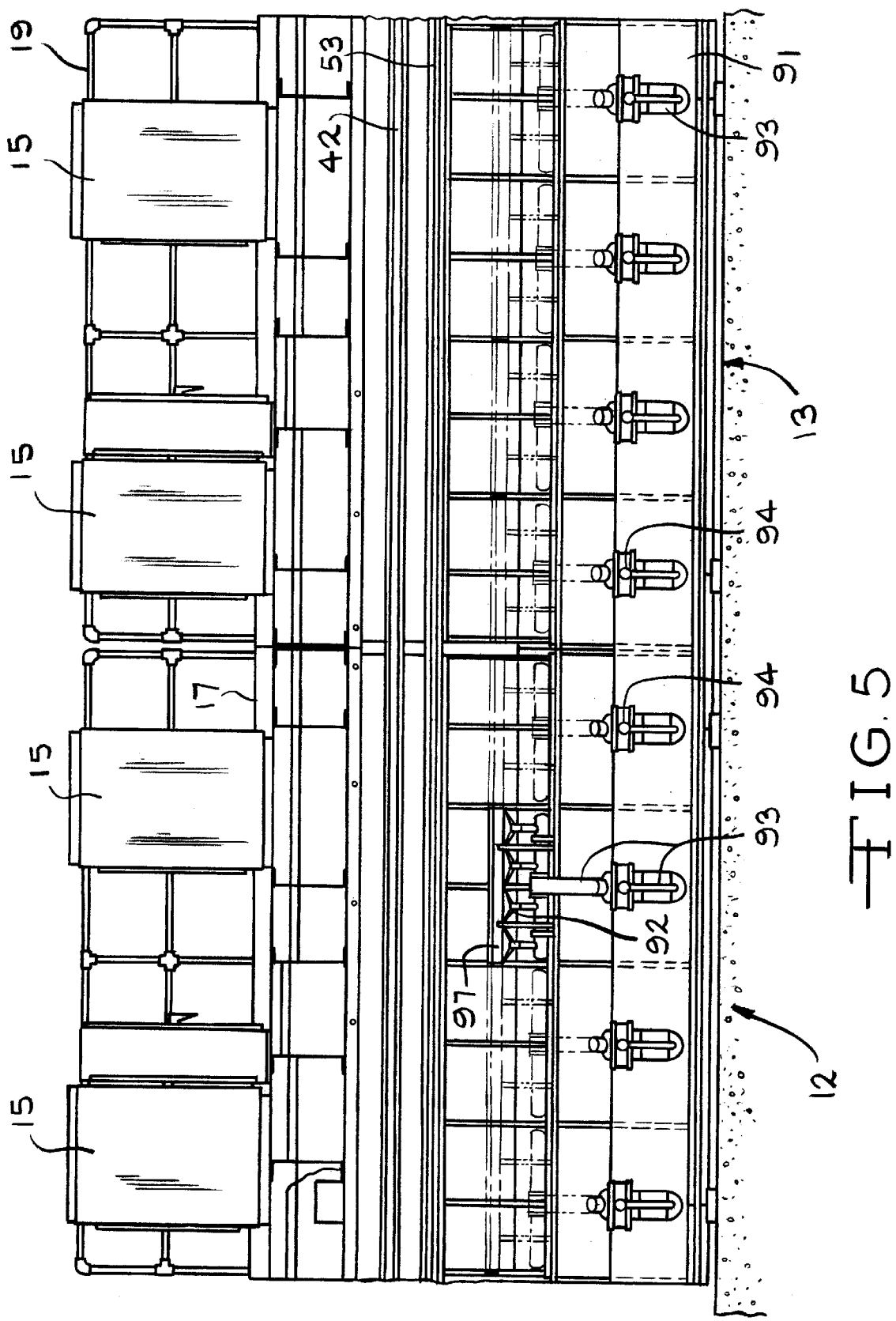
FIG. 5 is a right side elevation view of the processing modules of the machine of FIG. 1.
Figure 6:
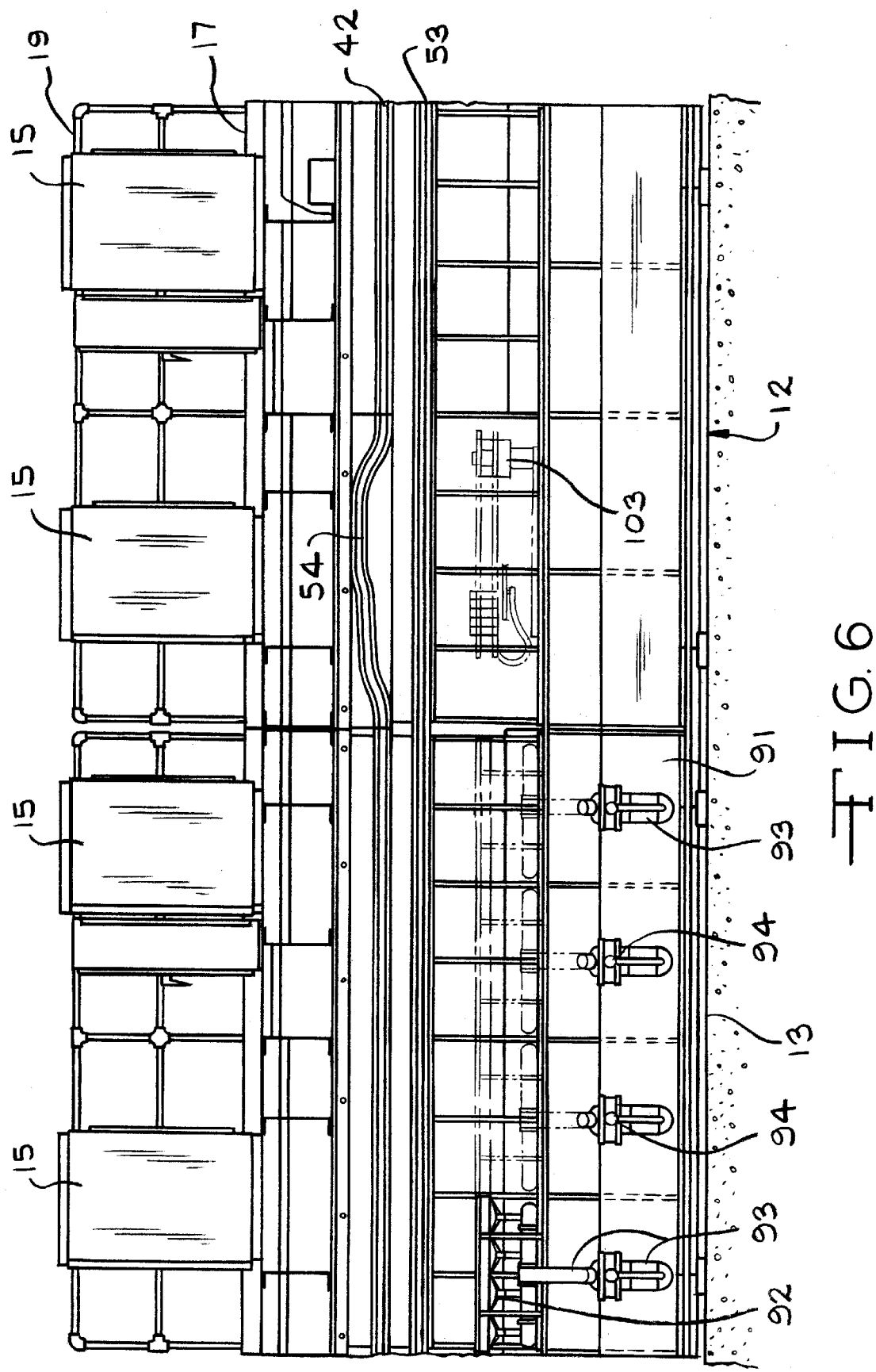
FIG. 6 is a left side elevation view of the processing modules of the machine of FIG. 1.

For the purposes of this description, the crystallizer machine will be described as having four distinct modular sections: the preheat, pickup and drive module 10 as shown in FIGS. 1–3; the takeup module 11 as shown in FIGS. 1–2; and the heating and cooling processing modules 12, 13 as shown in FIGS. 5 and 6. The modules of the crystallizing machine are designed to provide a mezzanine level 14, when joined together into a single operative machine. The mezzanine level 14 carries the cold air generating units 15 and blower fan units 16 and provides a walkway 17 for the operators. The mezzanine level 14 is accessible by a ladder or step assembly 18 provided on the end of the preheat, pickup and drive module 10 and includes safety railings 19 provided about the perimeter of the mezzanine level 14. The floor of the mezzanine 14 incorporates a hot air plenum 21 and a cold air plenum 22 as shown in FIG. 13.

Referring now to FIGS. 1–3, the drive mechanism for the crystallizer machine is located in the preheat pickup and drive module 10. The drive mechanism includes a motor 27 engaged with a drive shaft 28 through a gear reducer 29. The drive mechanism further includes a brake assembly composed of a disc brake rotor 30 fixed to the drive shaft 28, brake shoes 31, and brake actuator 32. A drive sprocket rotary cam 33 is engaged with the drive shaft 28 and a drive sprocket 34 is also engaged with the drive shaft 28 through coupler 35. A secondary drive shaft 36 is engaged with the drive sprocket 34 and receives drive forces imparted by the drive motor 27 through the drive shaft 28 and coupler 35. The secondary drive shaft 36 provides driving forces through the 90° gear box 37 to a timing belt drive pulley 38.

Referring now to FIG. 3, the timing belt drive pulley 38 is engaged with a timing belt driven pulley 39 by drive timing belt 40. Thus, drive power is imparted from the drive motor 27 to the in-feed apparatus.

Referring to FIGS. 1–6, the transport member is shown. A top rail 42 is aligned with the drive sprocket rotary cam 33 and a takeup traction wheel rotary cam 43 which is located in the takeup module 11. The top rail 42 extends the full length of the crystallizing machine. A bottom rail 53 is aligned with the drive sprocket 34 and extends the full length of the crystallizing machine to a lower takeup traction wheel 44, also located in the takeup module 11. The takeup traction wheel rotary cam 43 and takeup traction wheel 44 assembly is joined together by a shaft 45 mounted in a spherical bearing which is bolted to a frame member 46. The frame member 46 is mounted on a slide bar frame 47. A pneumatic piston actuator 48 is engaged with the frame member 46 and provides a positive force against the frame member 46, thereby tensioning the takeup traction wheel rotary cam 43 and traction wheel 44 assembly to provide full tension and takeup on the plug carrier 49 which is engaged between the drive sprocket 34 and the lower takeup traction wheel 44.

Figure 7:
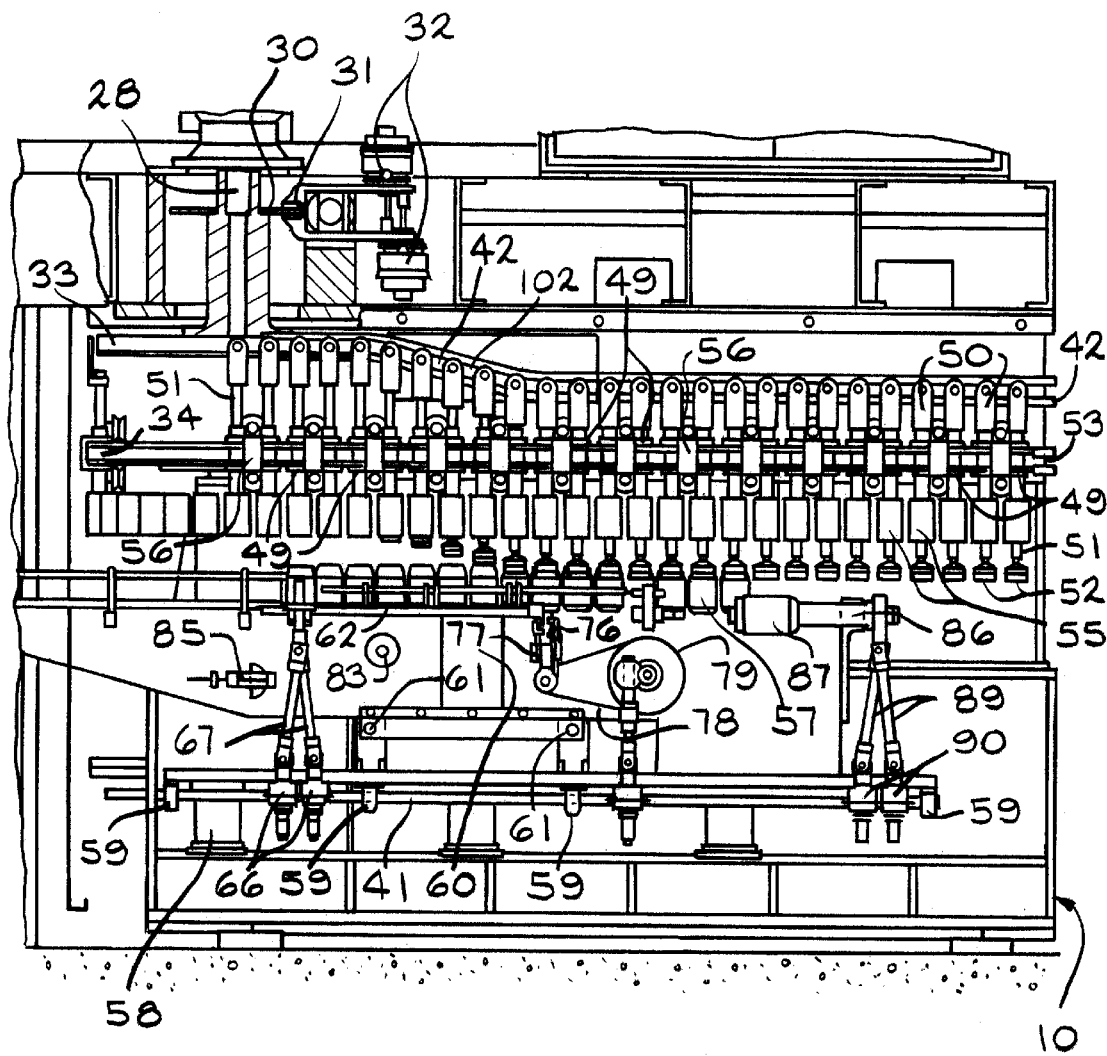
FIG. 7 is a detail right side view of the preheat and pickup module of the machine of FIG. 1.

Viewing FIG. 7, the drive sprocket rotary cam 33 is in alignment with the top rail 42. Cam follower members 50 are engaged with the top rail 42 for guided travel thereon around the machine. The cam follower members 50 will travel along the top rail 42 from the drive sprocket rotary cam 33, past the takeup traction wheel rotary cam 43 and return to the drive sprocket rotary cam 33. The drive sprocket rotary cam 33 is elevated in relation to the top rail 42 for reasons set forth below. Each cam follower member 50 carries an elongated quill 51 at the end of which is a plug 52 which is preferably composed of a coated metal, such as hard coat anodized aluminum. Drive sprocket 34 and lower takeup traction wheel 44 are in alignment with the bottom rail 53. A plug carrier 49 is fixed to travel on the bottom rail 53 as it is driven by the drive sprocket 34. The plug carrier 49 includes a plurality of cam members 56 which ride on the bottom rail 53. The plug carrier 49 also includes a plurality of openings, preferably two per plug carrier link through which the quills 51 extend. Workpiece strippers 55 are fixed to the plug carrier 49 in alignment with the openings and the quills 51 and plugs 52 extend therethrough. Each workpiece stripper 55 and its respective quill 51 and plug 52 have matching centerlines. The plug carrier 49 provides the drive movement to the combined plurality of top cam follower members 50 and attached quills 51 and plugs 52 and bottom cam members 56 with workpiece strippers 55. The top cam follower member 50 and top rail 42 combination provides vertical centering for the plug 52 and the bottom cam member 56 and bottom rail 53 combination provides horizontal centering for the plug 52. Thus, the plug centerline is maintained on very rigid vertical and horizontal axes.

The top rail 42 is designed to have a first elevated portion 54 located on the left side of processing module 12, as shown in FIG. 6, and a second elevated portion 101, shown in FIG. 2, located on the left side of the preheat, pickup and drive module 10, which aligns the rail 42 with the drive sprocket rotary cam 33. The top rail 42 also includes an inclined portion 102 which immediately follows the drive sprocket rotary cam 33 located on the right side of the preheat, pickup and drive module 10, as shown in FIGS. 1 and 7. In operation, it can be seen that when the cam follower members 50 with attached quill 51 are traveling along the top rail 42 around the drive sprocket rotary cam 33, the respective plugs 52 are pulled up and positioned within the workpiece stripper 55. As each cam follower member 50 with attached quill 51 travels down the inclined portion 102 of the top rail 42, the quill 51 gradually is extended through the workpiece stripper 55, thereby positioning the plug 52 to a predetermined location below the workpiece stripper 55. It is in this position that the plug 52 engages the workpiece to carry it through the processing operations of the crystallizing machine. After the workpiece is fully processed, the cam follower member 50 travels up the first elevated portion 54 of the top rail 42 which pulls the plug 52 up into the workpiece stripper 55, thus forcing the workpiece to be removed from its engagement of the plug 52. The finished workpiece is then removed from the crystallizer machine by an exit conveyor 103, shown in FIG. 6. As the cam follower member 50 continues to travel along top rail 42, it exits the first elevated portion 54, moving to a lower position, thereby extending the plug 52 from the workpiece stripper 55. The plug 52 is then preheated by heat lamps 96, as will be described in detail later herein. As the cam follower member 50 travels up the second elevated portion 101 of the top rail 42, the preheated plug 52 is retracted into the workpiece stripper 55. The cam follower member 50 is carried by the drive sprocket rotary cam 33 to the inclined portion 102 of the rail 42. As the cam follower member 50 travels down the inclined portion 102, the preheated plug 52 extends out of the workpiece stripper 55 to engage a new workpiece.

Figure 4:
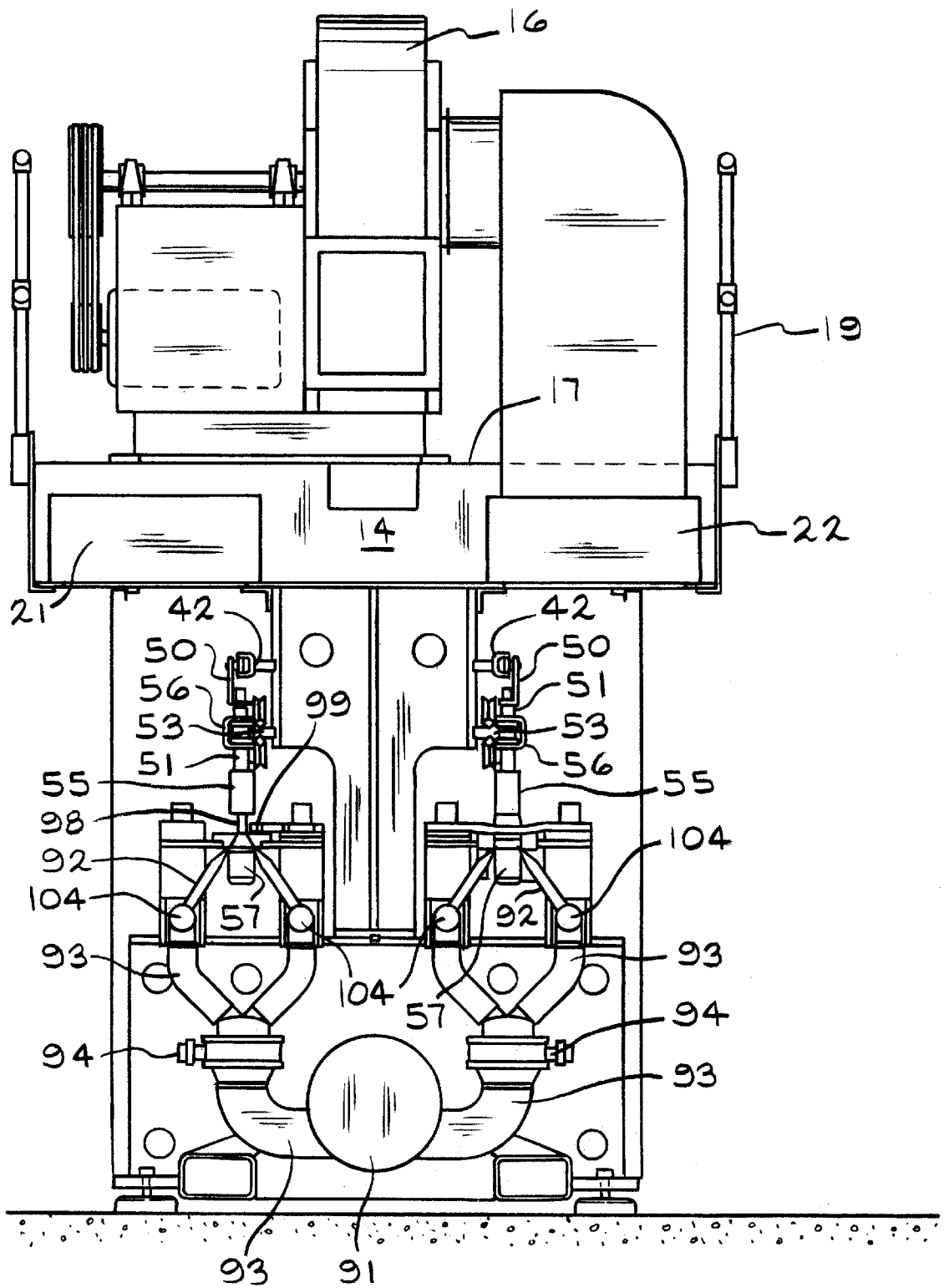
FIG. 4 is a back elevation view of the machine of FIG. 1.
Figure 8:
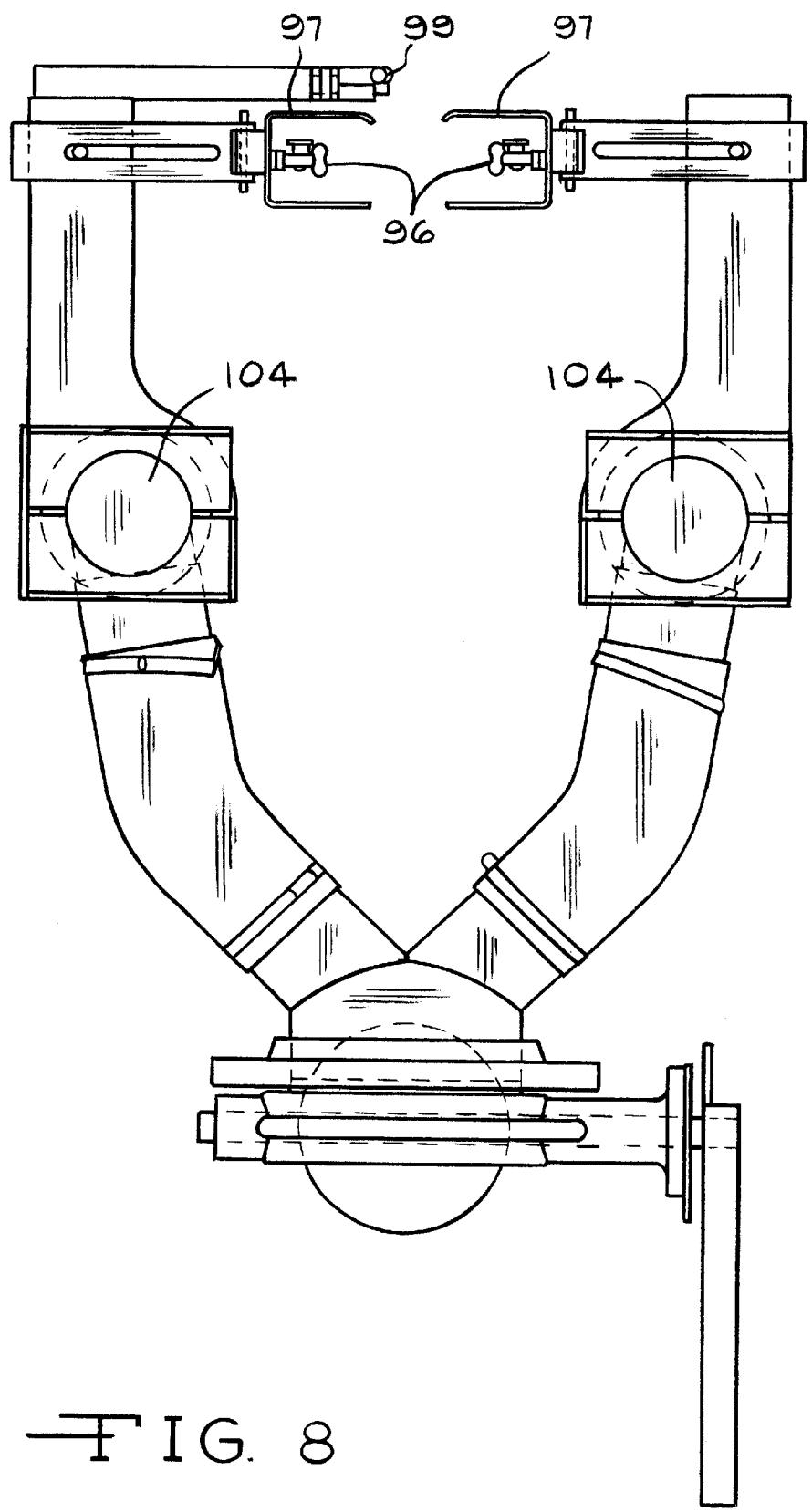
FIG. 8 is a detail elevation view of a preheating source used in the machine of FIG. 1.
Figure 9:
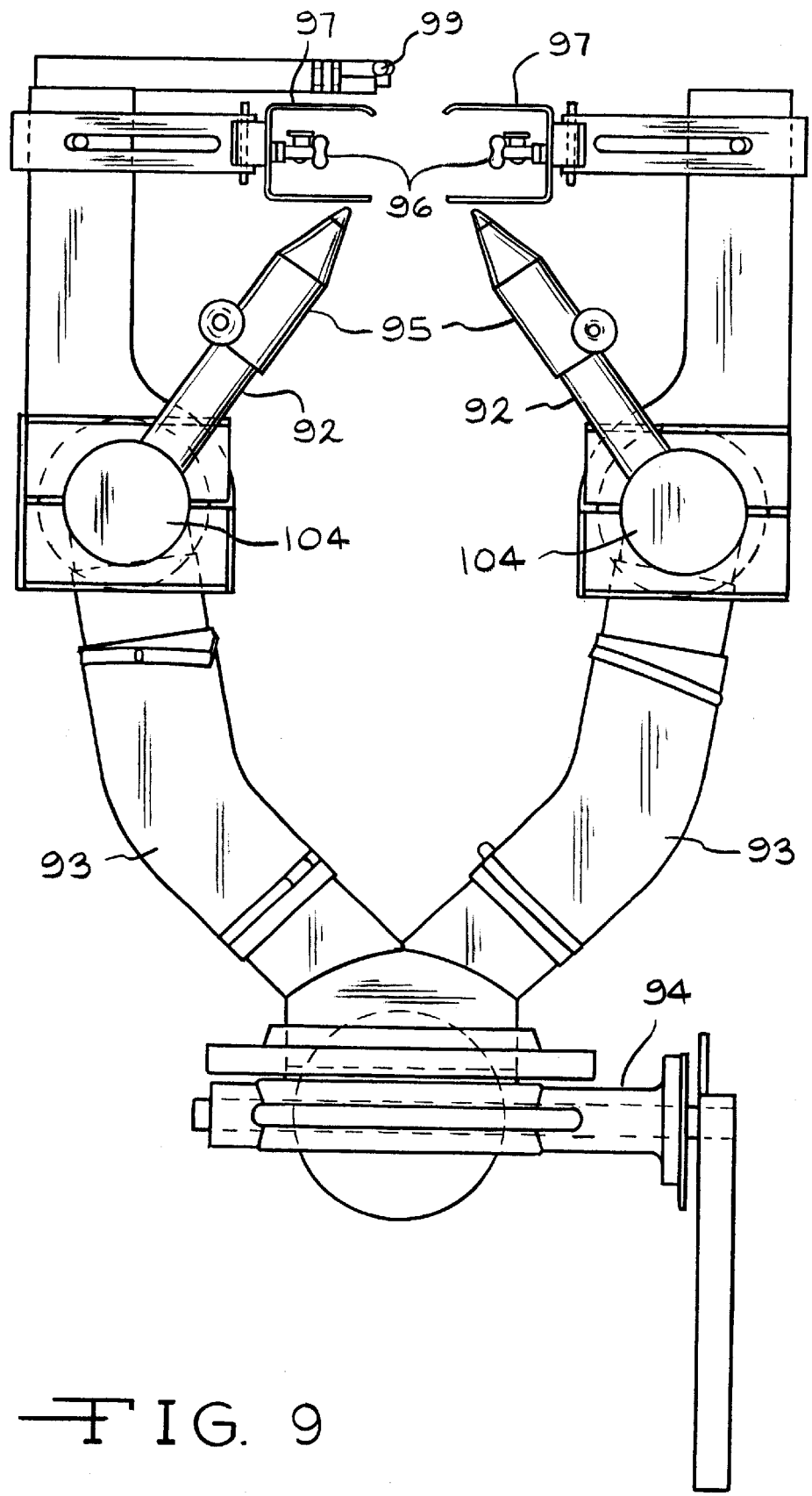
FIG. 9 is a detail elevation view of a cooling source and a heating source used in the machine of FIG. 1.
Figure 10:
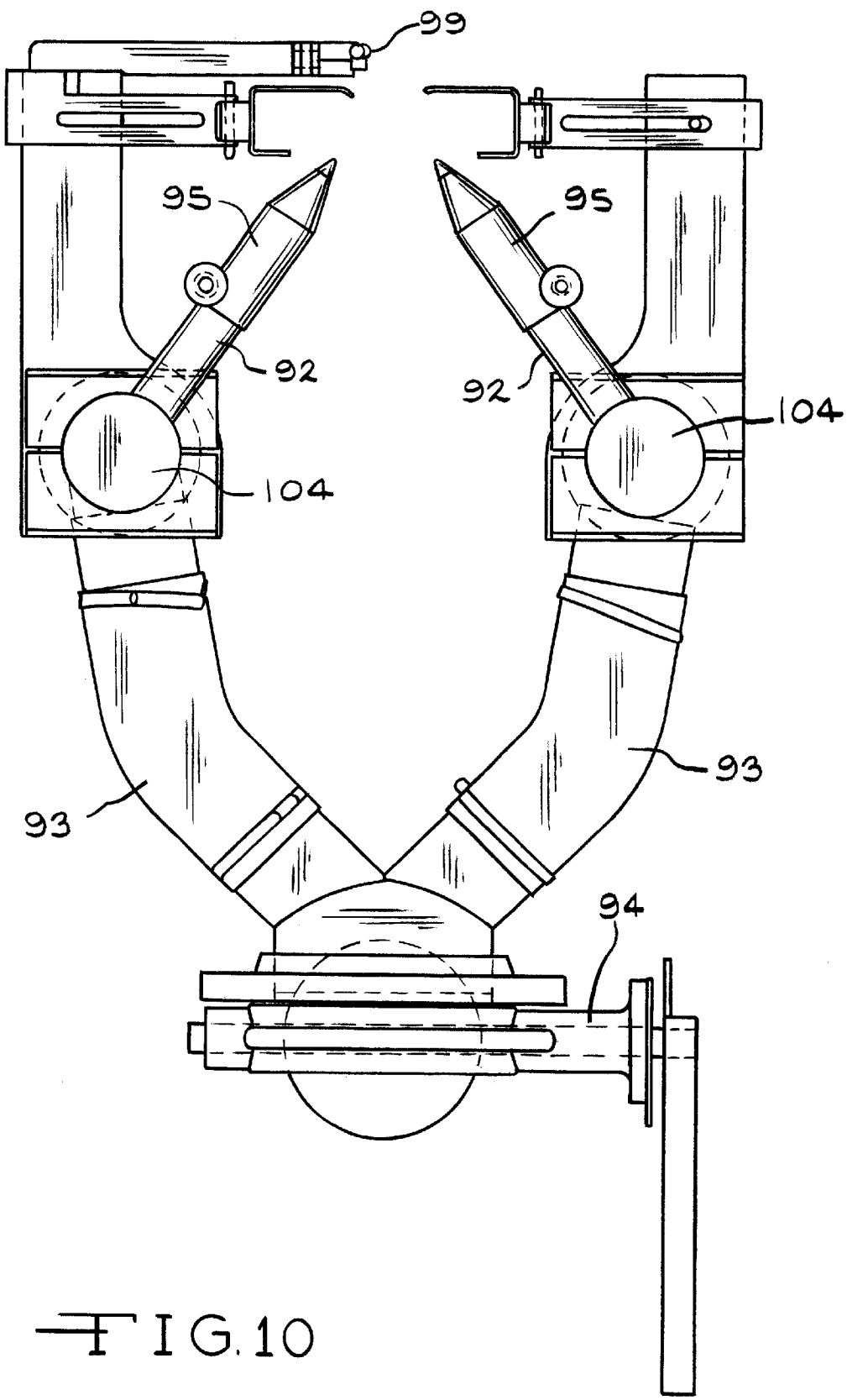
FIG. 10 is a detail elevation view of a cooling source used in the machine of FIG. 1.

Referring now to FIGS. 1, 2, 4 and 5, the heating and cooling apparatuses of the crystallizer machine of the present invention are detailed. FIG. 4 shows a back elevation view of the crystallizer machine showing the top rail 42 and bottom rail 53 which carry the cam follower members 50, 56, quill 51, workpiece stripper 55 and plug 52. FIG. 4 also shows the blower 16 for supplying cooling air to the cooling air plenum 22 which in turn supplies the cooling air to the cooling air duct 91 located at the bottom of the crystallizer machine. The cooling air duct 91 runs the length of the machine and supplies cooling air to the individual air knives 92 through adjoining duct work 93. Positioned in the duct work 93 are individual valve controls 94 which are used to regulate the amount of cooling air traveling to each set of air knives 92. Referring to FIGS. 9 and 10, the cooling air knives 92 include nozzles 95 which are rotatably mounted on the duct work 93. The duct work 93 includes flexible joints 104. Thus, the nozzles 95 may be adjusted by rotation and by movement of the duct work 93 about the joints 104 to adapt to differing sizes of workpieces. Referring to FIG. 9, the structure wherein the cooling air knives 92 are used in cooperation with heat sources to provide crystallizing temperature and cooling temperature simultaneously is shown. Positioned immediately above the air knives 92, as shown in FIG. 9, are heat lamps 96 positioned within reflectors 97. The heat lamps 96 are used to apply heat to the finish area of the workpiece 57 to cause crystallization thereof while the air knives 92 are intended to cool the workpiece 57 immediately below its finish area to prevent crystallization thereof. Finally, in the preheat section of the preheat pickup and drive module 10, as shown in FIGS. 2 and 8, the heat lamps 96 are used to preheat the plug member 52 and no air knives are in operation. Thus, in operation, the plug member 52 is preheated prior to insertion into the mouth of the workpiece. The workpiece then travels past the heat lamps 96 and air knives 92 such that the finish area of the workpiece receives heat from the preheated plug 52 and the heat lamps 96 to crystallize the finish area. The workpiece finally passes the cooling air nozzle as shown in FIG. 10 prior to exiting the machine.

Referring now to FIGS. 1 and 5, the right side elevation of the crystallizer machine of the present invention is shown. The processing modules 12 and 13, shown in FIG. 5, and the takeup module 11 include a plurality of the heat lamps 96, reflectors 97, and air knives 92, as shown in FIG. 9, which extend the full length on the right side of the processing modules 12 and 13 and up to a point proximate the takeup wheels 43, 44 of the takeup module 11. To ensure a full understanding of the Figs., the air knives, heat lamps and reflectors are only partially shown in number in the Figures. The plug 52 is preheated to a temperature of about 250° F. prior to insertion into the mouth of the workpiece 57. It should be noted that the preheat temperature for the plug will fall within the range of 175° F. to 350° F., depending upon the qualities of the thermoplastic being crystallized and its design requirements. As the preheated plug 52 carries the workpiece past the heat lamps 96 and reflectors 97, the finish area of the PET workpiece is gradually heated to a crystallizing temperature of approximately 350° F. while the air knives 92 maintain the remainder of the body of the workpiece cool.

To provide even preheating of the plug 52, the quill 51 has a gear 98 positioned immediately above the plug 52 which engages a stationary gear drive member 99, as shown in FIG. 8. Movement of the workpiece and engagement between the gear 98 and stationary gear drive 99 causes the plug 52 to continually rotate as it moves past the preheat sources, thereby providing even heat application to the surface of the plug 52. As shown in FIGS. 9 and 10, the engagement between the gear 98 and the stationary gear drive member 99 will impart continuous rotation to the workpiece engaged with the plug 52 as it travels past the various heat sources and cooling sources.

Referring now to FIGS. 2 and 6, the left side elevation of the takeup module 11 includes air knives 92 without heat lamps 96 as shown in FIG. 16. Cooling of the crystallized PET workpiece is effected by directing cool air from the air knives 92 over the entire workpiece 57 and plug 52. The workpiece continues to pass by cooling air knives 92 located on the back of the processing module 13 and part of the processing module 12 until the workpiece is removed and directed down the exit conveyor 103 located in processing module 12, as shown in FIG. 6. After the workpieces have been removed from the plug 52, the plug 52 passes the preheating source consisting of heat lamps 96 and reflectors 97 without air knives, as shown in FIG. 14 to effect preheating of the plugs 52.

Figure 11:
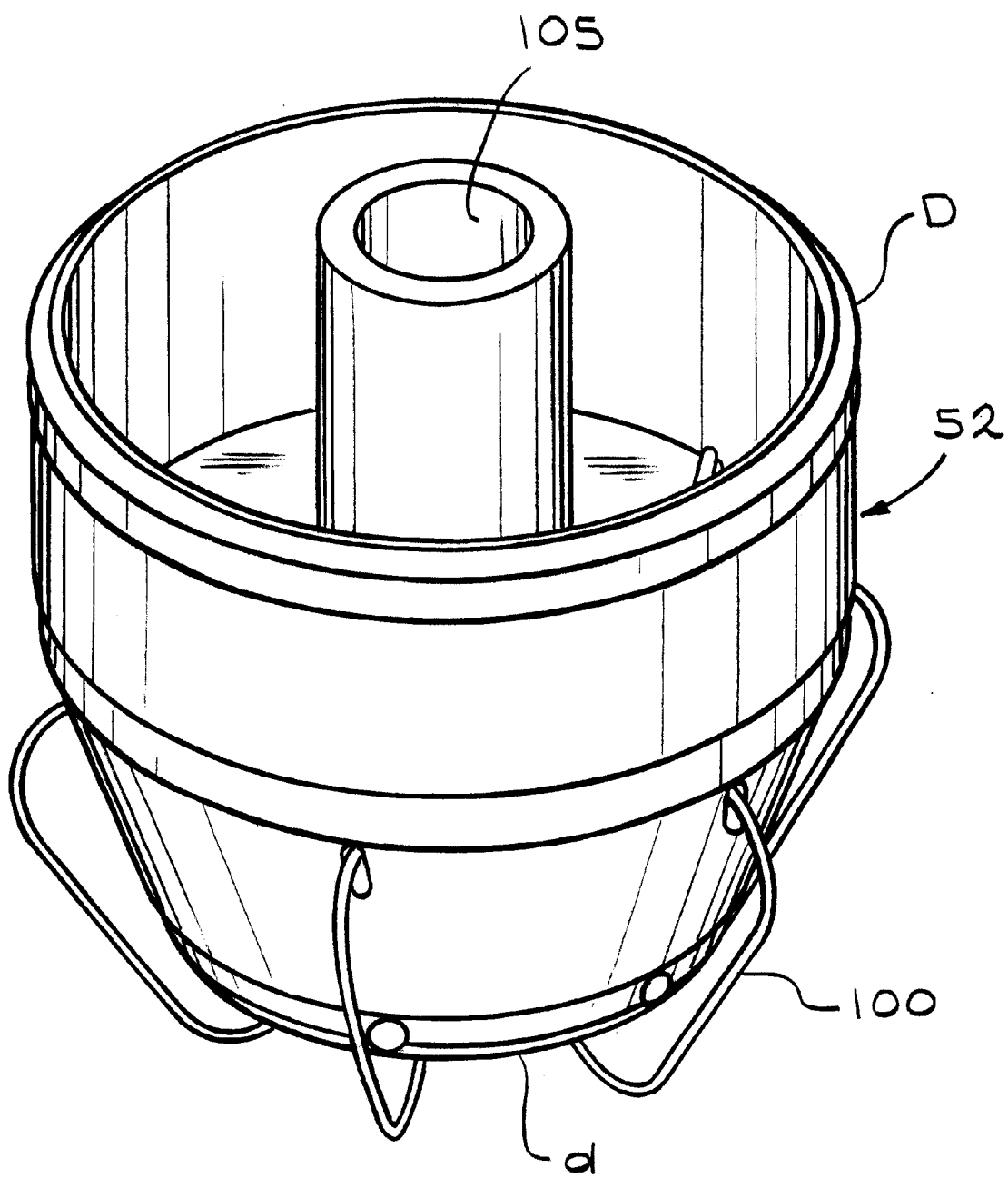
FIG. 11 is a perspective view of one embodiment of a workpiece pickup plug used with the machine of FIG. 1.

Referring now to FIG. 11, the preferred embodiment of the plug 52 is shown. The plug 52 is essentially a hollow shell constructed of hard coat anodized aluminum. The shell construction allows for rapid preheating of the plug 52 and cooling of the plug 52. An engagement aperture 105 is positioned on the centerline of the plug 52 to receive the quill 51 and attach the plug 52 thereto by conventional means. The outside diameter D of the plug 52 closely approximates the inside diameter of the mouth of the workpiece to provide a snug secure fit when the plug 52 is inserted into the mouth of the workpiece. The plug 52 tapers inward and downward from the outside diameter D to a smaller diameter d which assists the plug 52 to be inserted into the mouth of the workpiece. Flexible wire springs 100 are positioned about the tapered portion of the plug 52, defining an outside diameter slightly larger than diameter D. The wire springs 100 flex when inserted into the mouth of the workpiece and expand to exert forces on the interior of the workpiece, thereby assisting in securing the workpiece on the plug 52.

In summary, the process comprises the steps of first heating plug 52 to a predetermined temperature generally in the range of 175° F. to 350° F. The next step is to insert the heated plug 52 into mouth of thermoplastic workpiece 57. The next step is to apply heat to the exterior surface of workpiece 57. Given sufficient time, the applied heat and the heated plug 52 raise the temperature of the treated portion of workpiece 57 to allow the thermoplastic to crystallize. Once workpiece 57 is sufficiently crystallized, the last steps are cooling and removal from plug 52.

While this is the preferred embodiment, the inventors envision an alternative process embodiment wherein removal of workpiece 57 from plug 52 occurs substantially before cooling of workpiece 57 is complete. In this case, the workpiece 57 cools in open air without the plug 57 in place. Consequently, the temperature of plug 57 remains substantially at the predetermined temperature. The preheat section of the preheat pickup and drive module 10 functions to condition and maintain plug 57 at the desired temperature.

A third alternative embodiment envisions the use of the preheated plug 52 in combination with an infrared heater which absorbs heat into the interior of the finish area. However, the exterior surface of the finish area may sometimes overheat and deform, thereby requiring a flow of cooling air to be simultaneously applied to the exterior surface of the finish area as the finish area is receiving the infrared heat. Application of the cooling air assists into maintaining temperature control of the crystallization process.

The above description of the crystallizer machine is intended to demonstrate a machine capable of practicing the inventive process and is not intended to be limiting upon the scope and content of the following claims.

We claim:

1. A process for crystallizing a thermoplastic workpiece having an opening at one end comprising the steps of:

heating a plug member designed for insertion into and an engagement with the opening of the workpiece;

inserting the heated plug into the opening of the workpiece;

applying heat to an exterior surface of the workpiece such that the temperature of the workpiece is raised by the heated plug and the applied heat to a temperature at which the thermoplastic crystallizes; and cooling the heated thermoplastic after crystallization and removing the workpieces from the plug.

2. The process of claim 1 wherein said cooling of the workpiece is effected by cooling the exterior of the workpiece and cooling the plug member.

3. The process of claim 1 further including the step of cooling a first portion of the workpiece at the same time a second portion of the workpiece is being heated to the crystallization temperature.

4. The process of claim 1 wherein the workpiece is supported solely by the plug member during the crystallization heating step and the cooling step.

5. The process of claim 1 further including the step of removing the heated plug member from the workpiece before the thermoplastic is cooled.

6. The process of claim 1 further including the step of cooling the thermoplastic and the plug and removing the plug from the workpiece after the thermoplastic is cooled.

7. The process of claim 1 wherein the thermoplastic workpiece is polyester.

8. The process of claim 1 wherein the thermoplastic workpiece is polyethylene terephthalate.

9. The process of claim 1 further including the step of cooling the exterior surface of the finish area during the step of heat application to the same exterior surface.

* * * * *